US012722224B2

(12) United States Patent
Zimmermann et al.

(10) Patent No.: US 12,722,224 B2
(45) Date of Patent: Sep. 1, 2026

(54) METHOD FOR PRODUCING A LIGHT DEFLECTION STRUCTURE, USE OF A SUBSTRATE HAVING SUCH A LIGHT DEFLECTION STRUCTURE, AND LIGHT DEFLECTION UNIT HAVING SUCH A LIGHT DEFLECTION STRUCTURE

(71) Applicant: TRUMPF Laser—und Systemtechnik GmbH, Ditzingen (DE)

(72) Inventors: Felix Zimmermann, Ditzingen (DE); Malte Kumkar, Weimar (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 1016 days.

(21) Appl. No.: 17/949,297

(22) Filed: Sep. 21, 2022

(65) Prior Publication Data

US 2023/0014077 A1 Jan. 19, 2023

Related U.S. Application Data

(63) Continuation of application No. PCT/EP2021/057440, filed on Mar. 23, 2021.

(30) Foreign Application Priority Data

Mar. 30, 2020 (DE) ..................... 10 2020 204 123.7

(51) Int. Cl.
*B23K 26/0622* (2014.01)
*B23K 26/082* (2014.01)
(Continued)

(52) U.S. Cl.
CPC ........ *B23K 26/0624* (2015.10); *B23K 26/082* (2015.10); *B23K 26/53* (2015.10); *B23K 2101/36* (2018.08); *B23K 2103/54* (2018.08)

(58) Field of Classification Search
CPC ............ B23K 2101/36; B23K 2103/54; B23K 26/0006; B23K 26/0624; B23K 26/082;
(Continued)

(56) References Cited

U.S. PATENT DOCUMENTS

| | | | |
|---|---|---|---|
| 6,945,078 B2 | 9/2005 | Fukuda et al. | |
| 2012/0128301 A1 | 5/2012 | Vallee et al. | |
| 2013/0208358 A1 | 8/2013 | Psaila et al. | |
| 2014/0153097 A1 | 6/2014 | Beresna et al. | |

(Continued)

FOREIGN PATENT DOCUMENTS

| | | | |
|---|---|---|---|
| DE | 102012200858 A1 | 7/2013 | |
| EP | 2965852 A1 * | 1/2016 | .......... G02B 5/3083 |

(Continued)

*Primary Examiner* — Woody A Lee, Jr.
*Assistant Examiner* — Adam M Eckerdt
(74) *Attorney, Agent, or Firm* — LEYDIG, VOIT & MAYER, LTD.

(57) ABSTRACT

A method for producing a light deflection structure includes the steps of: a) producing a first plurality of interaction regions, in which at least one laser beam interacts with the substrate material along a first path with a spatial overlap of the interaction regions, b) producing a second plurality of interaction regions with a spatial overlap of the interaction regions along a second path offset with respect and with a spatial overlap with the first path, c) optionally producing a further plurality of interaction regions with a spatial overlap of the further interaction regions along a further path offset with respect to and with a spatial overlap with the path used immediately before, and d) optionally carrying out step c) multiple times. The method also includes producing type II modifications of the substrate material, and changing at least one process parameter from one beam path to another beam path.

9 Claims, 2 Drawing Sheets

(51) Int. Cl.

| | |
|---|---|
| ***B23K 26/53*** | (2014.01) |
| ***B23K 101/36*** | (2006.01) |
| ***B23K 103/00*** | (2006.01) |

(58) Field of Classification Search

CPC .. B23K 26/355; B23K 26/53; B23K 26/0622; B23K 26/08; B23K 26/354; B23K 26/359; G02B 5/18; G02B 6/02; G02B 5/30; G02B 6/26; G02B 6/34; G02B 6/42; G02B 27/28; G02B 6/124; G02B 6/136; G02B 26/08; G02B 27/00; G02B 27/09; G02B 27/42; G02B 5/00; G02B 5/32; G02B 6/12; H01S 3/00; H01S 3/06; H01S 3/08; B82Y 10/00

See application file for complete search history.

(56) References Cited

U.S. PATENT DOCUMENTS

| | | | |
|---|---|---|---|
| 2015/0010029 A1 | 1/2015 | Lindinger et al. | |
| 2016/0122227 A1 | 5/2016 | Mimoun et al. | |
| 2018/0067254 A1 | 3/2018 | Mihailov et al. | |
| 2020/0054485 A1* | 2/2020 | Knox | B23K 26/082 |
| 2021/0265798 A1* | 8/2021 | Sakakura | B23K 26/0624 |
| 2022/0184740 A1 | 6/2022 | Guillotte et al. | |

FOREIGN PATENT DOCUMENTS

| | | |
|---|---|---|
| WO | WO 2017141188 A1 | 8/2017 |
| WO | WO 2018042441 A1 | 3/2018 |
| WO | WO 2018044811 A1 | 3/2018 |
| WO | WO 2018182946 A1 | 10/2018 |
| WO | WO 2019158910 A1 | 8/2019 |
| WO | WO 2020212728 A1 | 10/2020 |

* cited by examiner

DP
DP
DP
1
8
7
6
5
9
3
P1
P2,PN-1
P3,PN

DP
DP
DP
1
7
3
8
5
6
9
v
P1
P2,PN-1
P3,PN

METHOD FOR PRODUCING A LIGHT DEFLECTION STRUCTURE, USE OF A SUBSTRATE HAVING SUCH A LIGHT DEFLECTION STRUCTURE, AND LIGHT DEFLECTION UNIT HAVING SUCH A LIGHT DEFLECTION STRUCTURE

CROSS REFERENCE TO RELATED APPLICATIONS

This application is a continuation of International Application No. PCT/EP2021/057440 (WO 2021/197929 A1), filed on Mar. 23, 2021, and claims benefit to German Patent Application No. DE 10 2020 204 123.7, filed on Mar. 30, 2020. The aforementioned applications are hereby incorporated by reference herein.

FIELD

An aspect of the invention relates to a method for producing a light deflection structure, to the use of a substrate having such a light deflection structure, and to a light deflection unit having such a light deflection structure.

BACKGROUND

Such a light deflection structure comprises periodic material modifications, in particular refractive index modifications and scattering defects, for example vacancies or damage, in the volume or on the surface of a substrate, wherein these material modifications influence properties of light that is transmitted by the substrate.

Periodic material modifications have been used until now in particular in order to influence polarization properties of the transmitted light. However, in many cases, there has been demand for light-deflecting structures that have in particular a predetermined magnitude and/or orientation of the light deflection. For example, it is intended in a laser disk to couple desirable laser light generated by stimulated emissions into a specific, well defined direction, wherein undesirable, spontaneously emitted light is intended to be output over the widest possible solid angle range. In other structural elements, by contrast, for example solar cells, there is a wish to capture incoming light, if possible, and to keep it inside the structural part, that is to say to no longer steer it to the outside of the structural part.

SUMMARY

In an embodiment, the present disclosure provides a method for producing a light deflection structure, wherein a substrate material of a substrate is irradiated with at least one pulsed laser beam. The method includes a) producing a first plurality of interaction regions, in which the at least one laser beam in each case interacts with the substrate material, along a first path with a spatial overlap of the interaction regions and b) producing a second plurality of interaction regions with a spatial overlap of the interaction regions along a second path, which is offset with respect to the first path, with a spatial overlap with the first path. Optionally, the method includes c) producing a further plurality of interaction regions with a spatial overlap of the further interaction regions along a further path, which is offset with respect to the previously used paths, and with a spatial overlap with the path used immediately before, and d) optionally carrying out step c) multiple times in order to obtain a predetermined number of paths. The method further includes producing type II modifications of the substrate material, and changing at least one process parameter from one beam path to another beam path so as to produce a predetermined deflection geometry.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1A, 1B:
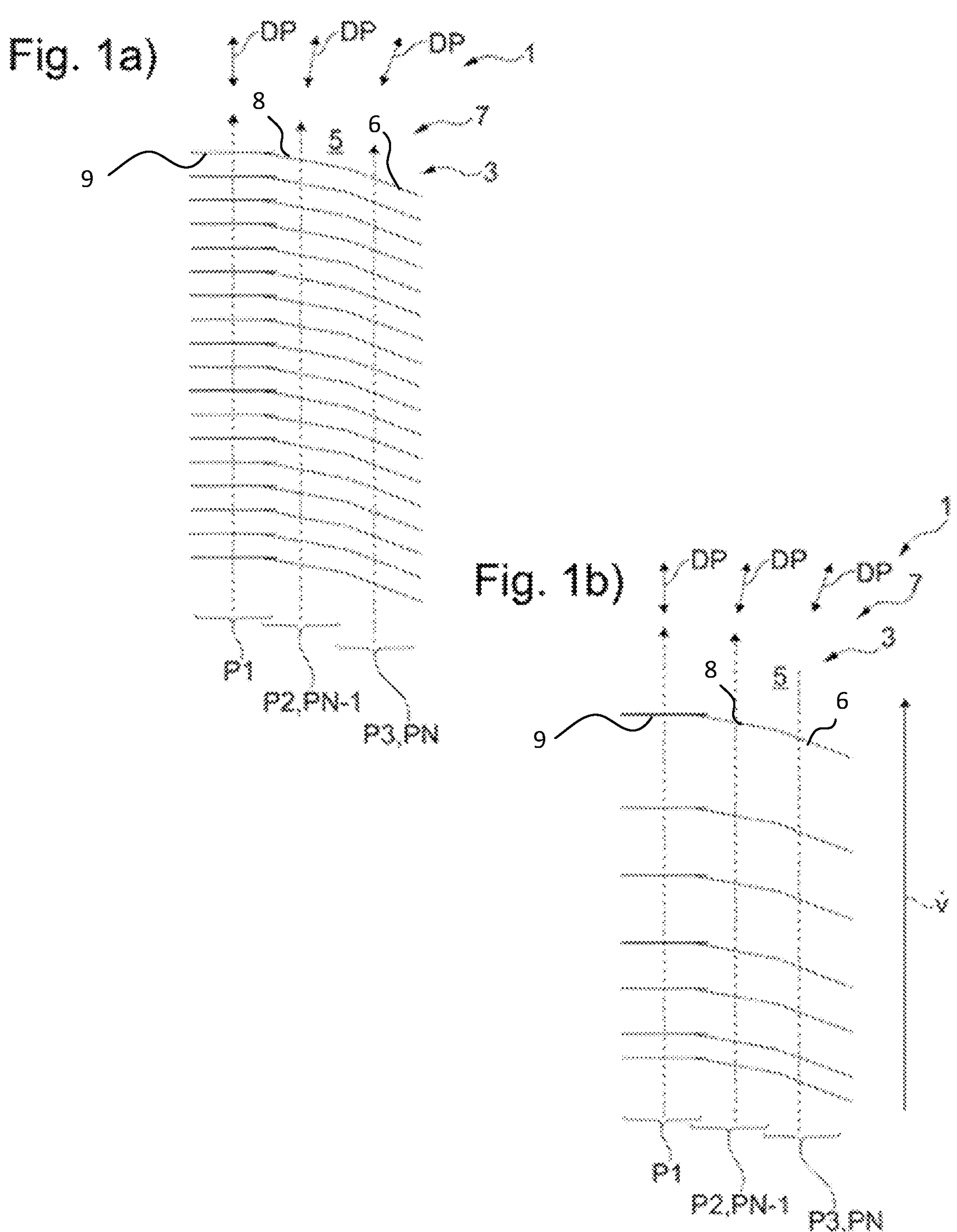
FIG. 1*a*) and FIG. 1*b*) show a schematic representation of two exemplary embodiments of a light deflection structure.

An aspect of the invention is to provide a method for producing a light deflection structure which makes targeted light deflection at least to a certain extent possible. It is furthermore an object of the invention to specify the use of a substrate having such a light deflection structure and to provide a light deflection unit having such a light deflection structure.

An aspect of the invention provides a method for producing a light deflection structure, wherein a substrate material of a substrate is irradiated with at least one pulsed laser beam, wherein the method includes the following steps. a) A first plurality of interaction regions is produced along a first path with spatial overlap of the interaction regions. b) A second plurality of interaction regions is produced with a spatial overlap of the interaction regions along a second path, wherein the second path is offset with respect to the first path and spatially overlaps the first path. c) Optionally, a further plurality of interaction regions is produced with a spatial overlap of the further interaction regions along a further path, which is offset with respect to the previously used paths, and with a spatial overlap with the path used immediately before. d) Optionally, step c) is carried out multiple times to obtain a predetermined number of paths, in particular until the predetermined number of paths has been obtained. Type II modifications of the substrate material are produced—in the overlapping interaction regions—and at least one process parameter is changed from path to path during the production in order to produce a predetermined deflection geometry. This means in particular that the at least one process parameter is changed from path to path such that the predetermined deflection geometry is produced. It is possible with the aid of the method to provide a light deflection structure that has in a defined manner a predetermined deflection characteristic for specific wavelengths of light that is transmitted through the substrate material.

An interaction region is here understood to mean in particular a spatial region in which the at least one laser beam interacts with the substrate material. An interaction is understood here to mean in particular that the substrate material undergoes a permanent material change, that is to say a material change that endures under normal conditions—in particular at 1013 mbar and 25° C., in the interaction region due to the laser beam. The interaction region is thus a spatial region in which the energy density or power density of the laser beam is higher than a modification threshold of the substrate material for permanent material changes.

A spatial overlap of the interaction regions is here understood to mean in particular that at least interaction regions that are directly adjacent to one another—along a path or at least in directly adjacent paths—overlap one another such that in particular the laser radiation in a second interaction region that overlaps with a first interaction region interacts with the material modification produced in the first interaction region or with the laser radiation in the first interaction region. The material modification or laser radiation in the first interaction region influences the effect of the laser radiation in the second interaction region, and, vice versa, the laser radiation in the second interaction region preferably influences the material modification or laser radiation in the first interaction region.

The substrate material is in particular transparent or partially transparent. In particular, the substrate material is transparent or partially transparent to the pulsed laser radiation used for producing the light deflection structure. In particular, the substrate material is transparent or partially transparent both to the pulsed laser radiation used for producing the light deflection structure and to at least one target wavelength of light that is to be deflected by the light deflection structure produced as intended. Transparency is understood to mean in particular that the transmission of radiation of a specific wavelength in the substrate material for cw radiation is greater than 80%, preferably greater than 85%, preferably greater than 90%.

It is possible that the method is carried out with exactly one pulsed laser beam, in particular with one pulsed laser beam per interaction region or one pulsed laser beam appropriately divided over the different interaction regions. Preferably it is then ensured with appropriate focusing that the fluence, in particular the energy density per unit area, in the interaction regions is greater than the modification threshold of the substrate material.

Alternatively, it is also possible to use a plurality of pulsed laser beams, in particular two pulsed laser beams per interaction region, for example by causing the pulsed laser beams to overlap in the respective interaction region. The fluence then lies above the modification threshold exactly where the laser beams overlap, even though the individual laser beams by themselves do not provide fluence above the modification threshold.

A plurality of laser beams can also be produced by appropriately dividing one pulsed laser beam produced by a laser source into a plurality of partial laser beams. This is also referred to as multiplexing.

The light deflection structure is preferably produced in the substrate material, that is to say in a volume of the substrate material. In particular, preferably a three-dimensional light deflection structure is produced in the volume of the substrate material. Accordingly, the different paths are preferably arranged not merely along one plane in the substrate material, but rather three-dimensionally distributed in the volume.

Alternatively or additionally, it is possible that the light deflection structure is produced on the surface of the substrate material. The individual paths then run at least partially or even entirely along the surface of the substrate.

The substrate material used is preferably a silicate-containing material, in particular silicate, fused silica or borosilicate. In particular, the substrate can be a glass, in particular a quartz glass, in particular borosilicate glass. However, it is also possible that the substrate is a polymer, a ceramic, a semiconductor, in particular comprising Si and/or GaAs, or a crystal.

Two paths overlapping spatially means in particular that the interaction regions of the two paths spatially overlap one another.

A path being offset with respect to another path means in particular that the path, in particular a centroid line or central line of the path, is located at a distance perpendicular to a centroid line or center line of the other path.

Type II modifications are in particular understood to mean material modifications of the substrate material that come about due to self-organizing effects by way of multiple irradiation of the same point—hence the spatial overlap of the interaction regions and of the paths. In particular, the previously irradiated point optically interacts with the laser beam when the same point is irradiated again; the previously irradiated point preferably acts as a grating. Anisotropic structures, which have a directional deflection effect due to their anisotropy, are formed in the process. A type II modification is in particular characterized by the fact that the effective refraction index varies laterally. The modification consequently behaves in particular like a single-axis optical crystal. Type II modifications being produced means consequently in particular that at least one process parameter, in particular a beam parameter of the at least one laser beam and/or at least one arrangement parameter of an arrangement of the interaction regions, is selected such that type II modifications are formed. The production of the type II modifications is based in particular on an optical effect and not on a thermal effect.

At least one process parameter being changed from path to path means in particular that, for at least two paths, different values are selected for at least one process parameter. In particular, preferably a value or a setting for at least one process parameter is changed between the production of a prior path and the production of a next path. It is possible that more than one process parameter is changed or that all process parameters are changed. An embodiment of the method in which all process parameters are kept constant for a plurality of paths, wherein at least one process parameter is changed for at least one further path or a plurality of further paths, is also possible. It is thus in particular also possible that paths are produced in groups with constant process parameters, wherein at least one process parameter is changed between different groups of paths. However, it is preferred to select for each path at least one process parameter that differs from that for an immediately adjacent path, in particular a path that was used previously and/or produced afterwards. It is possible that it is always the same process parameter or the same plurality of process parameters that is changed from path to path. It is also possible that different process parameters are varied from path to path.

A predetermined deflection geometry is in particular understood to mean that the light deflection structure is spatially-geometrically designed in such a way that light of a specific wavelength is deflected with a defined magnitude in a defined solid angle range.

The first plurality, the second plurality and the at least one further plurality can be different numbers, although it is also possible that at least two of these pluralities mean the same number.

According to a development of the invention, the pulsed laser beam has a temporal pulse width of at least 100 fs to at most 5 ps. The pulsed laser beam thus comprises in particular ultra-short laser pulses.

According to a development of the invention, an induced grating period of the light deflection structure is modulated by changing the at least one process parameter. In this way, what is known as a chirp is produced in the light deflection structure, which results in a broad deflection and/or scatter angle distribution. Such chirped structures with a variable period, in particular gratings, can be produced with a constant or variable alignment.

According to a development of the invention, a plurality of nano-grating layers in succession are produced in the substrate. It is possible in this way to amplify the deflection effect.

According to a development of the invention, the at least one process parameter within at least one path, selected from the first path, the second path, and optionally a further path in accordance with either of steps c) and d), is changed in order to produce the predetermined deflection geometry. The light deflection structure can be modified even more finely in this way. It is possible in particular in this manner to change, in particular modulate, the induced grating period of the light deflection structure within a path. In particular, 2D-adapted structures can be produced, wherein in particular the grating period within one path is changed, in particular by means of variable pulse energy and/or variable advancement of a laser spot of the at least one laser beam per unit time relative to the substrate, and additionally the grating period is changed in the same or different way from path to path, with the result that a two-dimensionally chirped grating is obtained that deflects or scatters light components having different angles of incidence at the same exit angle, or vice versa, depending on the application scenario. Likewise, the diffraction response can be designed to be continuously increasing or decreasing, in particular by changing a process parameter, in particular the pulse repetition rate, along a path in a manner such that the formation of gratings is inhibited, wherein the grating that is chirped in particular from path to path consequently changes with respect to its efficiency along the advancement.

Alternatively, the at least one process parameter is preferably kept constant within each path and changed only from path to path. In particular, all process parameters within the same path are preferably kept constant.

According to a development of the invention, a diffractive deflection geometry is produced. For this purpose, a period of the light deflection structure is preferably selected in particular to be larger than or approximately equal to a wavelength on which the deflection structure is intended to act. The deflection structure then has a diffractive effect for this wavelength.

Alternatively, a scattering deflection geometry is preferably produced. For this purpose, the period of the light deflection structure is preferably selected to be smaller than the wavelength on which the light deflection structure is intended to act. The substrate then represents an effective medium with a refractive difference, which leads to an anisotropic scattering of light of the intended wavelength.

Accordingly, deflection is generally understood to mean a change in the propagation direction of light, wherein the term “deflection” in particular encompasses diffraction or scattering.

In particular, the light deflection structure proposed here makes localized light deflection possible.

According to a development of the invention, at least one of the paths, selected from the first path, the second path, and optionally a further path in accordance with either of steps c) and d), runs along a straight line. This represents a particularly simple configuration of the method.

Alternatively or additionally, it is possible that at least one of the paths, selected from the first path, the second path, and optionally a further path in accordance with either of steps c) and d), has a finite curvature at least in certain regions. The path can also be curved overall. It is possible here to produce light deflection structures and deflection geometries that are coordinated even more flexibly and accurately. The curvature being finite means that it is greater than zero, which is to say it does not vanish. The curvature can be constant or at least vary in certain sections along the path.

The at least one process parameter is in particular selected from at least one beam parameter of the at least one laser beam and at least one arrangement parameter of the arrangement of the interaction regions. An arrangement parameter here in particular relates to the spatial-geometric arrangement of the interaction regions or the production of the spatial-geometric arrangement of the interaction regions. As will be explained in more detail below, the different interaction regions can be produced simultaneously or successively in time, wherein they can be produced successively in time in particular by shifting a focus region or laser spot of the at least one laser beam relative to the substrate. In this latter case, the arrangement parameter is in particular a shift parameter of the relative shift of the laser beam relative to the substrate.

Where the present text here and below specifies a relative shift or simply a shift of the laser beam relative to the substrate, this should by no means be understood in a limiting way to the effect that the laser beam is shifted and the substrate is kept in a spatially fixed position. Rather, it is possible that the laser beam is held in a spatially fixed position, while the substrate is shifted. It is also possible that both the laser beam and the substrate are shifted. A particularly preferred configuration, however, since it is particularly easy to implement, is that the substrate is held in a spatially fixed position, while the laser beam is shifted.

According to a development of the invention, the at least one process parameter is selected from a group consisting of: a spectrum of the laser beam, a pulse energy of the laser beam, a fluence of the laser beam, a temporal pulse width of the laser beam, a temporal pulse shape of the laser beam, a spatial pulse shape of the laser beam, the beam dynamics of the laser beam, a polarization, in particular a polarization direction of the laser beam, a pulse repetition rate of the laser beam, a micro-pulse repetition rate of the laser beam, a focus size, in particular a focus diameter or laser spot diameter of the laser beam, a focus cross-sectional shape of the laser beam, a focus profile of the laser beam, an advancement of a laser spot of the at least one laser beam per unit time relative to the substrate, a pulse number per laser spot or per unit length, and an overlap among immediately adjacent interaction regions.

A temporal pulse shape of the laser beam is in particular understood to mean the shape of an envelope of the temporal intensity profile of a laser pulse. By comparison, beam dynamics of the laser beam are understood to mean a temporal structure of the intensity profile within a pulse, consequently a temporal microstructure of the laser pulse, as it were. This in particular includes whether the laser pulse has a contiguous temporal pulse shape or consists of a burst or a plurality of bursts and is thus in the form of a pulse train.

A pulse repetition rate is in particular understood to mean a macro-pulse repetition rate, that is to say a repetition rate of the individual laser pulses or pulse trains. By contrast, a micro-pulse repetition rate is understood to mean a repetition rate of the individual micro-pulses or bursts within a laser pulse or pulse train.

A focus size is in particular understood to mean a spot size of the laser beam, in particular a characteristic extent or length of the laser spot in a plane perpendicular to the propagation direction, or an area of the laser spot in the plane. In the case of a Gaussian beam, the laser spot—or spot, for short—is defined as twice the beam waist radius R resulting from the peak wavelength λ divided by the sum of the circle constant 7C and the numerical aperture NA of the laser system ($R=\lambda/(\pi*NA)$).

A focus cross-sectional shape is in particular understood to mean the cross-sectional shape of the laser spot. A focus profile is in particular understood to mean the profile of the laser spot, in particular in the focal plane. A profile is here in particular a spatial intensity profile, that is to say in particular the intensity profile in the focal plane or on the spot area.

To ensure that type II modifications are obtained—for example self-organizing nanostructures, nanogratings or periodically arranged destructions—the pulse number per laser spot must be greater than 1. The pulse number per laser spot is obtained here from the spot size multiplied by the pulse repetition rate divided by the advancement speed. The pulse rate per laser spot accordingly ultimately corresponds to a pulse number per unit length, wherein this pulse number per unit length must be selected such that more than one pulse is incident over the longitudinal extent of the laser spot in the direction of advancement.

If the interaction regions are not produced in temporal succession but simultaneously, the pulse number per laser spot or the pulse number per unit length in particular corresponds to the overlap of immediately adjacent interaction regions.

According to a development of the invention, the wavelength, in particular peak wavelength, of the laser beam is at least 200 nm to at most 5000 nm.

Alternatively or additionally, the pulse repetition rate is preferably from at least 1 Hz to at most 5 MHz, preferably to at most 4 MHz, preferably to at most 3 MHz, preferably to at most 2 MHz, preferably to at most 1 MHz.

Alternatively or additionally, the micropulse repetition rate is preferably from at least 1 MHz to at most 50 GHz.

Alternatively or additionally, the temporal pulse width is preferably from at least 100 fs to at most 5 ps.

Alternatively or additionally, the fluence is preferably more than 0.01 $J/cm^2$, in particular for glass, in particular fused silica, as the substrate, preferably more than 0.1 $J/cm^2$, preferably more than 1 $J/cm^2$. The modification threshold in the volume of the substrate material is here typically more than 0.1 $J/cm^2$, possibly also more than 1 $J/cm^2$. By contrast, the modification threshold at the surface of the substrate material is reduced and is typically more than 0.01 $J/cm^2$, possibly also more than 0.1 $J/cm^2$. The fluence used is preferably selected to be greater than the respectively relevant value for the modification threshold.

Alternatively or additionally, the advancement of the laser spot per unit time relative to the substrate is preferably from at least 0.01 mm/s to at most 1000 mm/s, preferably up to at most 500 mm/s.

Alternatively or additionally, the pulse number per unit length is preferably greater than one pulse per μm (1/μm), wherein the term "pulse" here also includes a pulse train.

According to a development of the invention, the interaction regions along at least one path, selected from the first path, the second path, and optionally a further path in accordance with either of steps c) and d), are produced simultaneously. This can be effected in particular by means of a spatio-temporally shaped excitation beam and/or by means of a phase mask.

Alternatively, the interaction regions at least along one path, selected from the first path, the second path, and optionally a further path in accordance with either of steps c) and d), are produced preferably in temporal succession, in particular by shifting a focus region or laser spot of the at least one laser beam relative to the substrate. Writing the light deflection structure into the substrate is then done in particular point by point, in particular by scanning the laser beam.

Preferably, the interaction regions along all paths are produced simultaneously or in temporal succession.

Preferably, all of steps a) to d) are carried out either simultaneously or in temporal succession. It is thus in particular possible that steps a) to d) are also carried out simultaneously, in particular by means of a spatio-temporally shaped excitation beam and/or by means of a phase mask. It is also possible that a plurality of laser beams is shifted, offset with respect to one another, simultaneously along the paths, in particular at least one laser beam per path. In the event that the steps are carried out simultaneously, the term "path that was used previously" in step c) relates to the previously mentioned paths which, however, are produced at the same time as the respective further path. To this extent, the term "carried out multiple times" in step d) then also relates to the fact that basically a plurality of further paths is produced.

Shifting the focus region or the laser spot relative to the substrate can be done perpendicularly to the propagation direction of the laser beam and/or parallel to the propagation direction of the laser beam. What is important is only that the region of the laser beam in which a permanent material modification has been realized is shifted relative to the substrate.

According to a development of the invention, a predetermined temporal shape is impressed on individual pulses of the at least one laser beam. The resulting light deflection structure can be additionally influenced by temporally shaping the laser beam or the laser pulses, in particular individual pulses.

According to a development of the invention, the substrate is heated at least in certain regions after step b) in order to change the type II modifications produced. In particular, the substrate is heated at least in certain regions in a manner such that the type II modifications produced are changed—in a predetermined manner. Such subsequent heating of the substrate can be done to heal defects and for example change optical properties of the induced periodic material modifications. The substrate being heated at least in certain regions after step b) includes the fact that the substrate is optionally heated after step c) or after step d). In particular, the substrate is accordingly heated at the end of the production process, that is to say after all the interaction regions have been produced.

The substrate is here preferably heated to a temperature T, for which:

$$0.5T_g<T<1.2T_g,$$

wherein $T_g$ is the transition temperature of the substrate. The transition temperature is here in particular the temperature at which the viscosity of the substrate is $10^{12}$ Pas.

The object is also achieved by providing the use of a substrate having a light deflection structure, wherein the light deflection structure is produced in a method according to the invention or in one of the previously described embodiments of the method, wherein the substrate is used as an optical fiber, a laser disk, a glass display or a solar cell. This results in particular in the advantages described in conjunction with the light deflection structure.

In particular when the substrate is used as a laser disk, the light deflection structure can serve to couple desirable laser light that is produced by stimulated emission and amplified out of the laser disk in a defined direction. Alternatively, the light deflection structure can be provided in order to couple undesirable light that is produced by spontaneous emission and amplified out of the laser disk so that it is scattered as broadly as possible, in particular wavelength-dependent at different angles, with the result that the thermal load of surrounding regions due to such spontaneous emissions is reduced.

If the substrate is used as a solar cell, the light deflection structure can in particular contribute to the fact that light that is incident in the solar cell is kept therein and thereby the efficiency and yield of the solar cell is increased.

The problem is finally also achieved by providing a light deflection unit having a light deflection structure which is produced in a method according to the invention or in one of the embodiments of the method that are described above. In conjunction with the light deflection unit, in particular the already mentioned advantages are obtained.

FIG. 1 shows in a) a schematic illustration of a first exemplary embodiment of a light deflection unit 1 with a first exemplary embodiment of a light deflection structure 3, which is produced in a substrate material 5 of a substrate 7 by means of at least one pulsed laser beam, in particular in a method comprising the following steps: A first plurality of interaction regions 9 is produced, of which only one been schematically marked and provided with the corresponding reference sign for the sake of a better overview. The interaction regions 9 are here produced along a first path P1—step a).

The light deflection structure 3 is produced in particular as a nanograting, the grating lines of which are illustrated in FIG. 1 by black lines.

In step b), a second plurality of interaction regions 8 is produced along a second path P2, wherein the second path P2 is offset with respect to the first path P1 but spatially overlaps with the first path P1, which is illustrated here by overlapping curly brackets. This means in particular that the interaction regions of the second plurality of interaction regions 8 which are arranged along the second path P2 overlap with the interaction regions 9 of the first plurality of interaction regions 9 that are arranged along the first path P1.

Optionally, a further plurality of interaction regions 6 is produced along a further path PN, which is offset with respect to the previously used paths P1, P2, and with a spatial overlap with the path PN-1 used immediately before. Specifically, a third plurality of interaction regions 6 is produced here with a spatial overlap along a third path P3, which is offset with respect to the first path P1 and to the second path P2, but overlaps with the second path P2—step c).

This step c) can be carried out multiple times—step d)—until a predetermined number of paths has been obtained.

As part of the method, type II modifications are produced in the substrate material 5.

At least one process parameter is changed from path to path in order to produce a predetermined deflection geometry. It is also possible that at least one process parameter is changed during the production of at least one path—within the path—in order to produce the predetermined deflection geometry.

The deflection geometry can be a diffractive deflection geometry or a scattering deflection geometry.

In the exemplary embodiment illustrated here, the paths P1, P2, P3 run along straight lines. However, it is also possible that at least one of the paths runs along a curve, in particular along a circular arc. Other geometries for different paths are also possible.

The at least one process parameter is preferably selected from a group consisting of: a spectrum of the laser beam, a pulse energy of the laser beam, a fluence of the laser beam, a temporal pulse width of the laser beam, a temporal pulse shape of the laser beam, a spatial pulse shape of the laser beam, the beam dynamics of the laser beam, a polarization, in particular a polarization direction, of the laser beam, a pulse repetition rate, a micro-pulse repetition rate, a focus size or laser spot size, in particular focus diameter or laser spot diameter, a focus cross-sectional shape or laser spot cross-sectional shape, a focus profile or laser spot profile, an advancement of a laser spot per unit time relative to the substrate 7, a pulse number per laser spot or a pulse number per unit length on the substrate 7, and an overlap among immediately adjacent interaction regions 9, 8, and 6.

In the exemplary embodiment illustrated here, the polarization direction—here illustrated schematically by way of double-headed arrows DP—as the process parameter is changed from path to path.

The interaction regions 9, 8, and 6 are preferably produced at least along a path simultaneously or in temporal succession, in particular by shifting a focus region or laser spot of the at least one laser beam relative to the substrate 7.

The different paths can also be scanned simultaneously by a plurality of laser beams which are offset from one another, wherein in particular at least one laser beam is used for each path.

A predetermined temporal shape is preferably impressed on individual pulses of the at least one laser beam.

The substrate 7 is preferably heated at least in certain regions after step b), in particular after all the interaction regions 9, 8, and 6 have been produced along all paths P1, P2, PN, in order to change the type II modifications produced.

The light deflection structure 3 is preferably used as an optical fiber, as a laser disk, as a glass display, or as a solar cell.

On the whole, the invention is based on the idea that the production of periodic material modifications, in particular refractive index modifications, in the volume and/or at the surface of (partially) transparent materials by means of ultra-short laser pulses makes it possible to influence the properties of the transmitted light and to deflect the latter in a targeted manner. Geometric or structural properties of the induced modifications (for example period, refractive index contrast) and thus the magnitude and orientation of the deflection can be controlled by means of writing parameters and/or writing laser parameters, beam shaping and/or beam dynamics.

If ultra-short laser pulses of a writing laser are focused into the volume of a substrate, for example quartz glass, the high intensity present in the focus results in non-linear absorption processes, as a result of which the material modifications are induced. Writing can be carried out point by point and/or simultaneously at a plurality of spatial points, in particular using a spatio-temporally shaped excitation beam and/or by means of a phase mask.

The structures can be used to deflect light either in a refractive manner or on the basis of the inherent scattering in a specific angle range. The orientation of the deflection can here be controlled by the period of the grating, which is defined by laser parameters such as for example the wavelength of the writing laser. The magnitude of the diffraction efficiency can be controlled by different concepts, such as for example the laser pulse energy, the advancement and/or by means of beam dynamics, in particular temporally for example by laser bursts and/or by beam shaping.

Depending on the substrate material 5, the induced nanostructures can have greatly varying structural properties. In glasses, in particular nanogratings of microscopic holes with an anisotropic shape and dimensions with a length of a few hundred nanometers and a thickness of at least 10 nanometers are produced. Through irradiation using light, for example in the visual spectral range, a scattering cone, which is aligned according to the grating orientation—always parallel to the polarization of the writing laser and thus in particular perpendicular to the grating lines of the nanograting—arises due to the anisotropic structure. As part of the technical teaching introduced here, this targeted scattering can also in particular be used for deflecting the incoming light.

If such laser-induced nanogratings are written close to one another, in particular so that they overlap, the newly written grating is disposed coherently in line with the orientation of the existing grating. In particular, a self-organizing structure is formed. In this way, zones with for example continuously variable nanograting orientation can be produced—see FIG. 1*a*)—and thus light can be deflected or scattered within a large angle spectrum.

FIG. 1*b*) shows a further exemplary embodiment of a light deflection unit 1 with a further exemplary embodiment of a light deflection structure 3.

Elements that are the same or functionally the same are provided with the same reference signs in all of the figures, and so to this extent reference is respectively made to the foregoing description.

In this further exemplary embodiment, in particular the induced grating period is modulated by varying at least one process parameter within the individual paths. In particular, what is known as a chirp has been produced, as a result of which a broad deflection or scattering angle distribution is achieved. This can be achieved for example by varying process parameters such as advancement, pulse overlap and/or wavelength of the writing laser beam. Such chirped gratings can be produced with a constant or variable alignment. Moreover, a plurality of nanograting layers arranged one after the other can amplify the effect of the deflection.

Specifically, the process parameter changed here is the advancement of the laser spot per unit time relative to the substrate 7, consequently a shift speed of the laser beam, within the individual paths in order to modulate the grating period. Also illustrated here schematically by way of an arrow is an acceleration 1, of the laser beam within the individual paths. It goes without saying that, alternatively, the shift speed of the laser beam along a path can also be reduced.

As part of the technical teaching introduced here, the periodic modifications are adapted to the deflection geometry that is to be attained. That means in particular that grating lines of the nanogratings can have—depending on the application scenario—any desired angles with respect to the material surface. In particular, the geometry of the written periodic modifications is adapted to the application to be attained, wherein concepts such as beam dynamics, beam shaping, multi-beam processing (multiplex) can be used to produce extended modification regions in the material.

Subsequent heating of the light deflection structure 3 produced can be performed to heal defects and for example change optical properties of the induced periodic material modifications.

Various approaches are conceivable for writing periodic material modifications. Firstly, ultra-short laser pulses can be focused into the volume of the substrate 7 using a microscope objective, and extended regions can be structured by scanning the substrate 7 and/or the laser spot. Furthermore, the modification or absorption region can be changed by beam-shaping elements in the processing head, such as diffractive optical elements, spatial light modulators, or by acousto-optic deflectors. The latter can also be effected highly dynamically during processing. In particular, digital optical units or scanners with acousto-optic deflectors can be used. The temporal absorption dynamics can be modified by short pulse trains, in particular bursts.

In a first step, preferably the dependences of the periodic material modifications to be produced on the different process parameters are defined for a substrate material 5 to be processed and are stored as a table in a program. Next, a specific diffraction or scattering or grating period can be specified, and the control parameters for the processing can be taken from the table.

Figure 2:
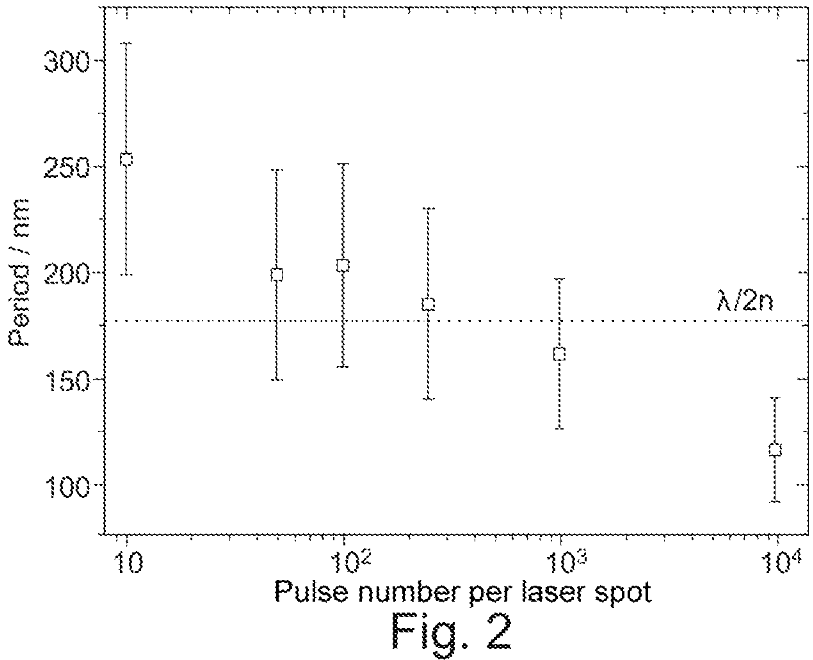
FIG. 2 shows by way of example the dependence of a period of a light deflection structure produced in a specific substrate material on the pulse number per laser spot.

FIG. 2 illustrates by way of example such a dependence of the periodic material modifications to be produced on a process parameter, here specifically the dependence of the period of the nanograting produced on the pulse number per laser spot. The period of the material modifications is obtained here in particular by $\lambda/2n$, that is to say by the wavelength $\lambda$ of the laser beam used divided by twice the refractive index n of the substrate material 5.

Figure 3:
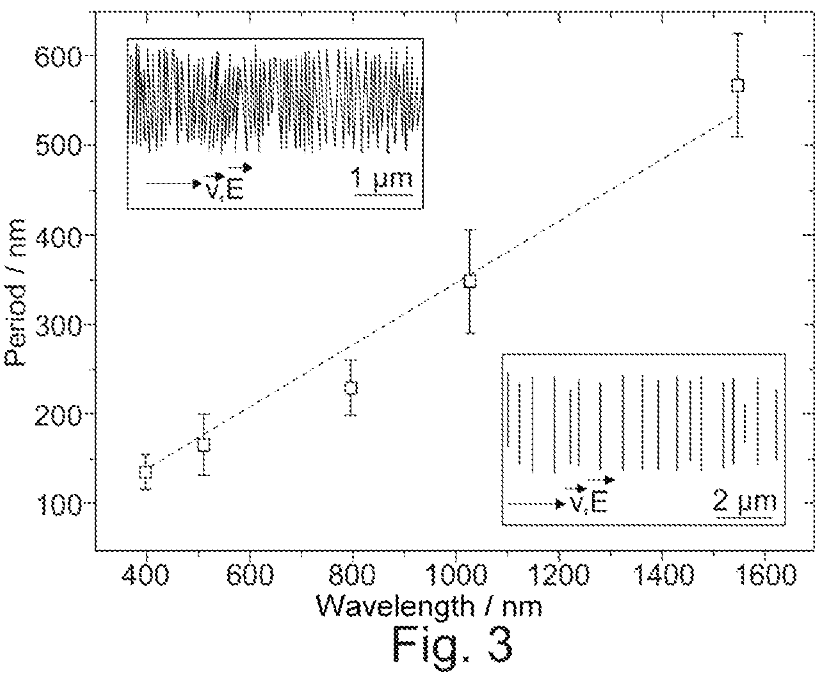
FIG. 3 shows by way of example the dependence of the period of a light deflection structure produced in a specific substrate material on the wavelength of the laser radiation used for the production.

FIG. 3 shows by way of example the dependence of the period of the material modifications produced on the wavelength $\lambda$ of the writing laser.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing a light deflection structure, the method comprising:

irradiating a substrate with at least one pulsed laser beam in a first plurality of interaction regions along a first path, the first plurality of interaction regions being spaced apart from each other along the first path; and irradiating the substrate with the at least one pulsed laser beam in a second plurality of interaction regions along a second path, which is offset with respect to the first path, the second plurality of interaction regions being spaced apart from each other along the second path, wherein each respective interaction region of the first plurality of interaction regions overlaps with a corresponding interaction region of the second plurality of interaction regions;

wherein the at least one pulsed laser beam interacts with a substrate material of the substrate in the first plurality of interaction regions and the second plurality of interaction regions to produce type II modifications of the substrate material, and wherein at least one process parameter of the at least one pulsed laser beam is changed from the first path to the second path so as to produce a predetermined deflection geometry.

2. The method as claimed in claim 1, wherein the at least one process parameter is changed within the first path, or within the second path.

3. The method as claimed in claim 1, wherein the predetermined deflection geometry includes a diffractive deflection geometry or a scattering deflection geometry.

4. The method as claimed in claim 1, wherein at least one of the first path and the second path runs along a straight line or has a finite curvature at least in certain regions.

5. The method as claimed in claim 1, wherein the process parameter is selected from a group consisting of: a spectrum, a pulse energy, a fluence, a temporal pulse width, a temporal pulse shape, a spatial pulse shape, the beam dynamics, a polarization, a pulse repetition rate, a micro-pulse repetition rate, a focus size, a focus cross-sectional shape and a focus profile, an advancement of a laser spot per unit time relative to the substrate, a pulse number per laser spot, and an overlap among immediately adjacent interaction regions.

6. The method as claimed in claim 1, wherein the first; plurality of interaction regions and the second plurality of interaction regions are produced simultaneously or in temporal succession.

7. The method as claimed in claim 1, wherein a predetermined temporal shape is impressed on individual pulses of the at least one laser beam.

8. The method as claimed in claim 1, further comprising heating the substrate at least in certain regions in order to change the type II modifications.

9. The method as claimed in claim 1, wherein the substrate is configured for use as an optical fiber, a laser disk, a glass display or a solar cell.

* * * * *